INVENTOR.
WILLIAM DUBILIER
BY
ATTORNEY

Jan. 23, 1962 W. DUBILIER 3,018,064
CAPACITOR TAB INSERTION
Filed July 10, 1957 3 Sheets-Sheet 2
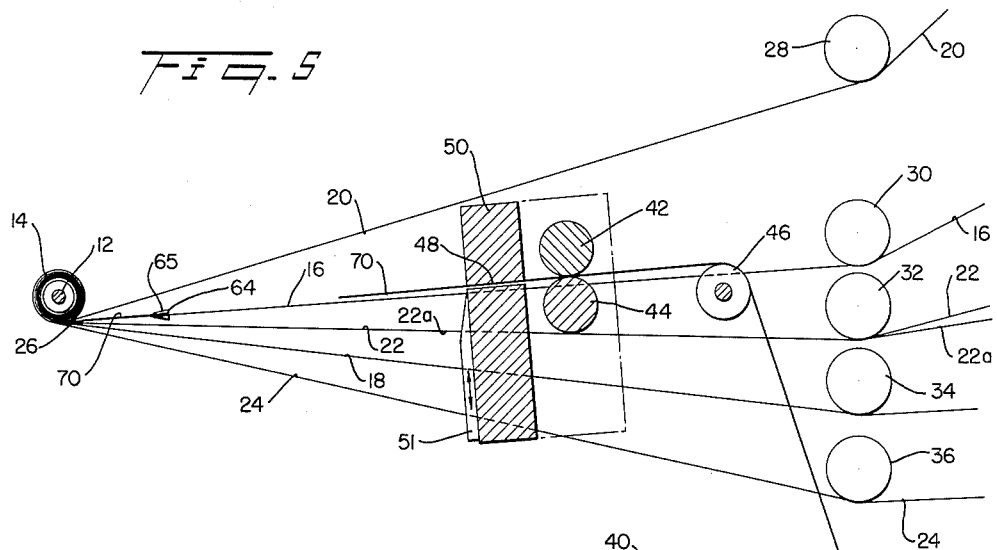
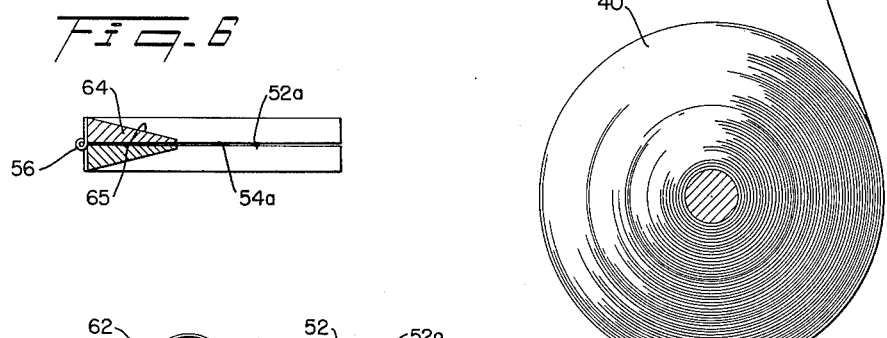
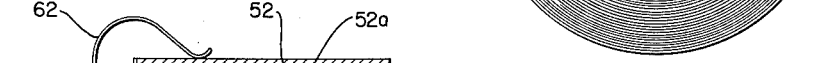
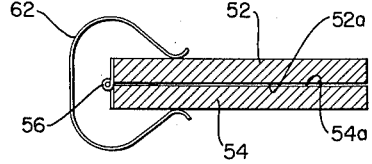
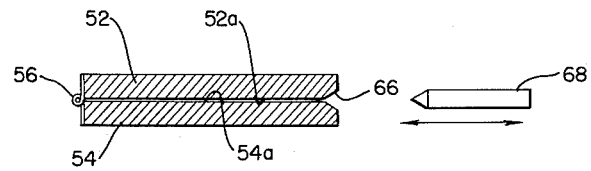
INVENTOR.
WILLIAM DUBILIER
BY
ATTORNEY Jan. 23, 1962 W. DUBILIER 3,018,064
CAPACITOR TAB INSERTION
Filed July 10, 1957 3 Sheets-Sheet 3
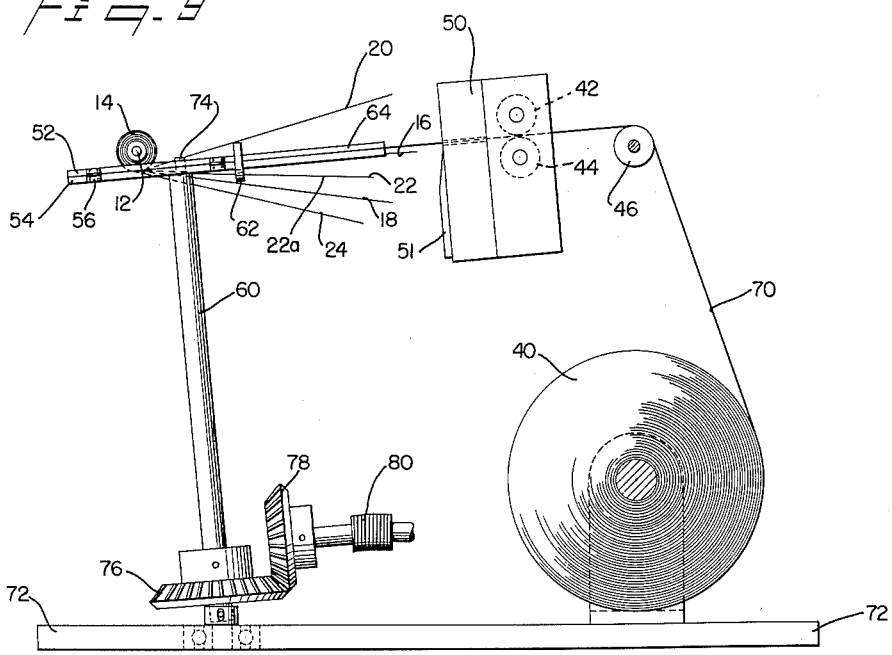
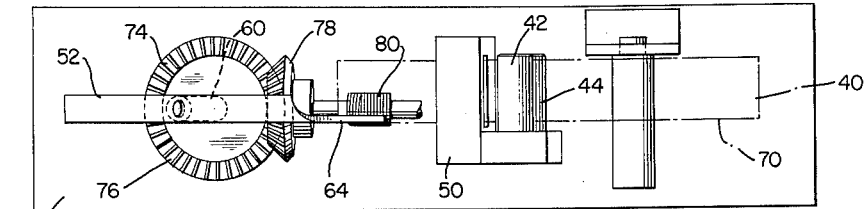
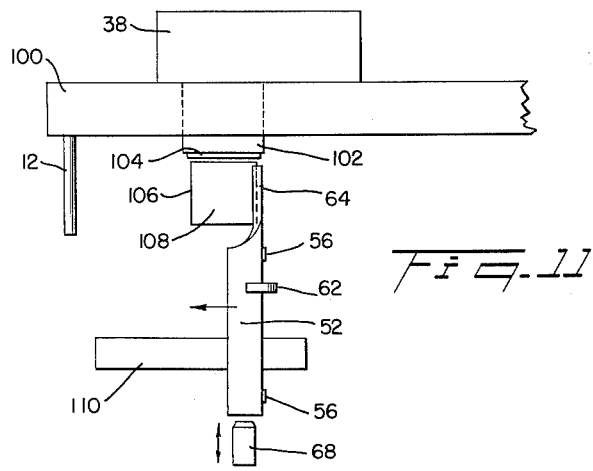
INVENTOR.
WILLIAM DUBILIER

United States Patent Office 3,018,064
Patented Jan. 23, 1962

3,018,064
CAPACITOR TAB INSERTION
William Dubilier, New Rochelle, N.Y., assignor to Cornell-Dubilier Electric Corporation, South Plainfield, N.J., a corporation of Delaware
Filed July 10, 1957, Ser. No. 671,001
3 Claims. (Cl. 242—56.1)

This invention relates to the fabrication of electrical capacitors and particularly to methods and apparatus for effecting the insertion of terminal tab members into convolutely wound capacitor units during the winding thereof.

In conventional capacitors of the roll type, conducting and dielectric layers are spirally wound into a roll with the conducting layers of opposite polarity being selectively connected to terminal leads generally extending outwardly from the opposite ends of the roll. As is well known in this art, the conducting layers may be constituted by individual metal foil strips, suitably separated by one or more dielectric strips, or alternatively by metallized coatings on strips of dielectric material. In certain roll type capacitor constructions metallic tab members are inserted at appropriate positions in the rolled unit in selective contact with the conducting layers therein and are sized so as to project beyond the end roll and permit soldered or other suitable securement of extending terminal elements thereto. It is to the fabrication of this latter type of convolute capacitor construction that the invention herein disclosed particularly relates.

Present day practice in the insertion of the conventional relatively narrow tab elements in convolutely wound capacitor sections, as well as in the employment of relatively wide tab members for the purposes disclosed in the co-pending application of James H. Cotten and Felix S. Weiss, Serial No. 634,236, filed January 15, 1957, now Patent No. 2,939,060, requires the stopping of the capacitor winding operation in order to insure that the contained edges of the inserted tab member be disposed substantially parallel to the axis of the wound unit, i.e., with the contained edges disposed substantially perpendicular to the longitudinal axis of the conducting and dielectric strips forming said section. Attempted insertion of the tab members without an interruption of the winding operation has heretofore resulted in a number of completed sections having the tabs disposed therewithin in skewed relationship wherein the inserted tab member is angularly disposed relative to the axis of the wound unit, i.e., is not disposed perpendicular to the longitudinal axis of the conducting and dielectric strips forming said wound section. With the conventional narrow tab members presently employed, a certain minimal amount of skewing of the inserted tab can be tolerated, although finished sections will be rejected if the amount of skew becomes unduly large. However, utilization of the wider type of tab member for the purposes disclosed in said above identified co-pending application requires that the skewing of the tab member be held to an absolute minimum, if not practically eliminated. In present day practice the attaining of the desired positioning of the tab members requires, as a practical matter, that the winding of the rolled section be halted so as to permit the desired insertion and alignment of the tab members. Although such practice results in the desired disposition of the tab member relative to the axis of the wound unit the interruption of the winding operation effects serious reductions in the productive capacity of the winding machines employed. Such halting of the winding machines can result in as much as a 30 to 40 percent drop in the productive capacity of said machines and in a consequent increase in production cost per finished unit.

This invention may be briefly described as including means by which terminal tab members of predetermined desired size may be inserted with the desired positional relationship at appropriate locations in convolutely wound capacitor sections during the winding operation and without interruption thereof. The invention includes the provision of means to releasably grasp a terminal tab member of predetermined dimension together with means for displacing the grasping means into a predetermined positional relationship relative to the bite of the capacitor section being wound upon a winding mandrel so as to permit the introduction of the leading edge of said tab member into said bite and the consequent removal or stripping of the tab, by action of the winding of the conducting and dielectric layers forming the capacitor section, from the grasping means.

The object of this invention is the provision of novel apparatus by which insertion of tab members in desired positional relationship within convolutely wound capacitor sections may be effected without interruption of the capacitor winding operation.

Another object of the invention is the provision of terminal tab insertion apparatus in which the terminal tab member is mechanically grasped, held and positioned continuously up to the time of engagement thereof by the converging foil and dielectric strips on the winding mandrel.

Other objects and advantages of the invention herein disclosed will be pointed out in the following disclosures and claims and will be illustrated in the accompanying drawings which illustrate, by way of example, the presently preferred embodiments by which the principles of the invention herein incorporated may be practically utilized.

Referring to the drawings:

FIGURE 5 is a side elevational view of the apparatus illustrated in FIG. 4;

FIGURE 6 is an enlarged section on the line 6—6 of FIG. 4;

FIGURE 7 is an enlarged section on the line 7—7 of FIG. 4;

Figure 4:
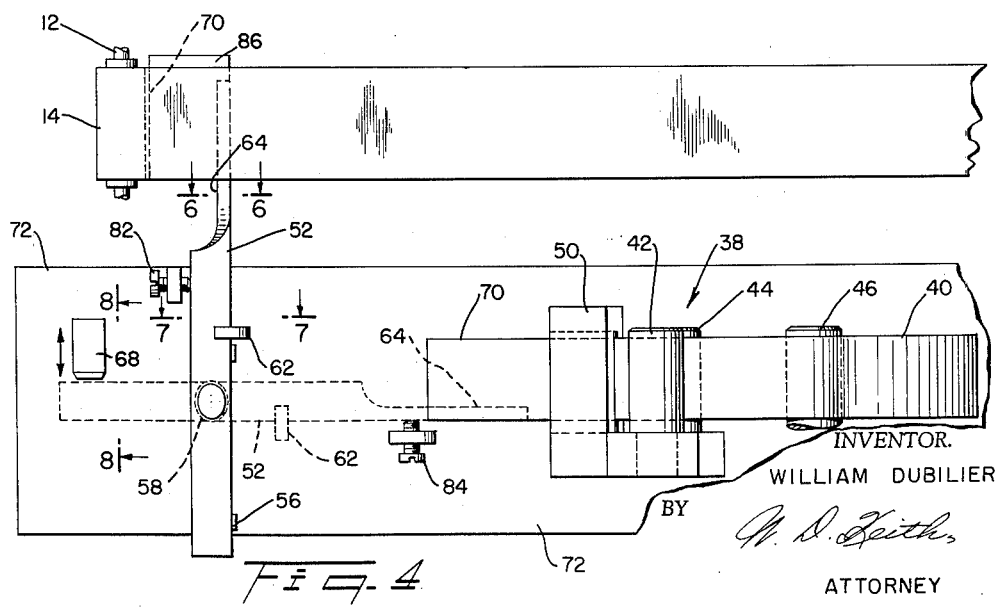
FIGURE 4 is a schematic plan view of the essential of a presently preferred mechanism incorporating the principles of the invention.

FIG. 8 is an enlarged section on the line 8—8 of FIG. 4 but showing arm members 52 and 54 when swung into the dotted line position;

FIGURE 9 is a schematic side elevational view of the essentials of a drive system for the mechanism illustrated in FIG. 4;

FIGURE 10 is a schematic plan view of the structure illustrated in FIG. 9;

FIGURE 11 is a schematic plan view illustrating an alternative construction incorporating the principles of the invention.

Figure 1:
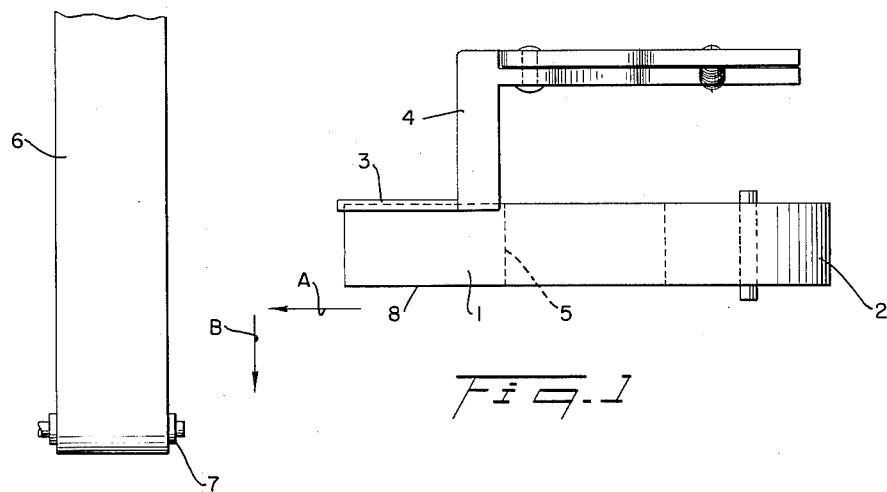
FIGURE 1 is a plan view schematically illustrative of the operative steps and apparatus employed in the practice of the invention.
Figures 2, 3:
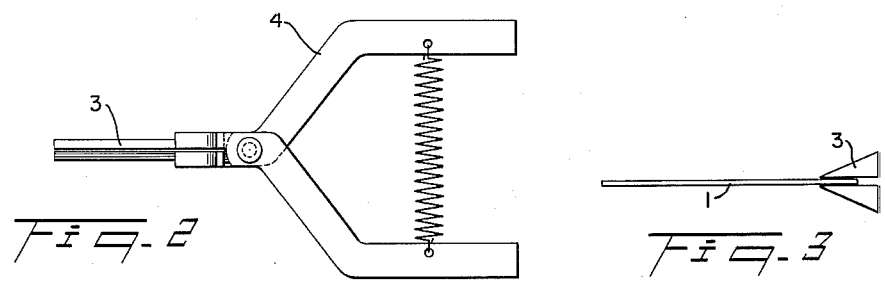
FIGURE 2 is a side elevational view of a portion of the apparatus illustrated in FIG. 1.
FIGURE 3 is an end elevation on an enlarged scale of a portion of the apparatus illustrated in FIG. 2.

FIGURES 1–3 illustrate, in simple and schematic form, the broad aspects of the invention herein disclosed. In such aspect it contemplates the feeding of the lead end 1 of terminal tab material in strip form from a supply roll 2 thereof intermediate the narrow grasping ends 3 of a tweezer or scissor like member, generally designated 4. After the edge portion of the advanced length of terminal tab material is grasped by the grasping ends 3 of the tweezer member 4, the desired length thereof is severed from the remainder of the strip supply, as at 5, such length being predetermined in accordance with the specifications for the particular capacitor which is being wound, in the usual manner, of foil and dielectric strips 6 on a mandrel 7.

The tweezer like member 4, after the severing of the lead end 1 of the terminal tab material from the remainder thereof, is then advanced in the direction indicated by the arrow A to introduce the grasping end 3 thereof and the grasped terminal tab member 1 intermediate the converging foil and dielectric strips 6 with the leading edge 8 of the tab being disposed parallel to the axis of the mandrel 7.

Such displacement is halted when the grasped tab member 1 is disposed in the desired ultimate positional disposition relative to the transverse dimension of the capacitor being wound, which positioning will, of course, be determined by the specification for the particular capacitor being fabricated. With the grasped tab member being so positioned, the tweezer like member 4 is next advanced in the direction indicated by the arrow B a sufficient distance to permit the grasping of the lead edge 8 of the tab member 1 by the converging adjacent surfaces of the foil and dielectric strips 6 being wound to effect the removal or stripping of the tab member 1 from the engagement heretofore maintained by the grasping end 3 of the tweezer like member 4.

The above sequence of operations assures the desired positional disposition of the terminal tab 1 in the wound unit, since the tab element 1 is mechanically grasped at all times up to and including the stripping of the element by the action of the converging foil and dielectric strips forming the wound unit.

As illustrated in drawings and as particularly shown in FIG. 3, the grasping end 3 of the tweezer like member 4 is preferably made relatively thin and of somewhat tapered cross-section in order to facilitate a close approach to the point of convergence of the foil and dielectric strips being wound upon the mandrel 7 wherever necessary. In addition thereto the grasping end 3 of the tweezer like member should provide sufficient gripping surface to hold the severed tab element 1 securely during displacement thereof and yet permit a ready removal of the tab element 1 therefrom by the stripping action of the converging surfaces of the foil and dielectric strips 6 being wound upon the mandrel 7.

If desired the terminal gripping surfaces of the grasping end 3 of the tweezer like member may be coated with felt or other suitable material to produce the desired gripping and release characteristics.

The mechanical movements involved are relatively simple and are principally a matter of mechanical design. Fine control and adjustability of the amounts of displacement should be incorporated in order to assure the desired positioning of the tab element relative to the wound unit and to permit utilization of a single machine for insertion of tabs of various dimensions in wound capacitor sections of various dimensions.

By way of further example, FIGURES 4–9 illustrate, in somewhat more detail, apparatus incorporating the principles of this invention and in which the tab element is introduced intermediate the converging foil and dielectric strips by rotation rather than lineal movement.

FIGURES 4 through 9 schematically illustrate only certain of the essential elements of a conventional roll type capacitor winding machine, for the constructional details of such winding machine are well known in the art and since the actual winding of the capacitor section is effected in the well known and usual manner. There is illustrated, however, a rotatable mandrel member 12 on which the capacitor section 14 is wound. In the illustrated embodiment, and for the purposes of example, the capacitor section 14 being wound is formed by a pair of foil strips 16, 18, a pair of interleaving dielectric strips 22 and 22a and a pair of additional dielectric strips 20 and 24. The foil and dielectric strips are fed in the usual manner in a spaced relationship and are directed so as to converge at the mandrel 12 and to define, at the point of convergence thereof, a so-called "bite" area, generally designated 26. The lines of approach of the foil and dielectric strips to the mandrel 12 may be conveniently controlled by suitably positioned guide rollers, such as the illustrated rollers 28, 30, 32, 34 and 36 respectively.

Positioned to one side of the line of feed of the foil and dielectric strips forming the capacitor section 14 being wound upon the mandrel 12 is a terminal tab feed assembly generally designated 38. It will be understood that an individual terminal tab feed assembly such as the type to be hereinafter described should be provided for each terminal tab element being inserted in the wound unit. However, in the interests of clarity and brevity, only one of such units will be illustrated and described herein, with the understanding that if a pair of terminal tabs are to be inserted into a wound section a pair of such assemblies will be required.

As shown on the drawing, the essentials of the illustrated terminal tab feed assembly 38 include a supply roll 40 of suitable terminal tab material in strip form, such as foil of the same general character as that employed for the conducting layers of the wound unit but of somewhat greater thickness or preferably a strip of relatively thin tinned copper. The lead end of the strip of terminal tab material is drawn from the roll 40 over a suitably positioned guide roll 46 by a pair of driven feed rolls 42 and 44 suitably disposed within the frame of the terminal tab feed assembly 38. The feed rolls 42 and 44 advance the lead or free end of the strip of terminal tab material through a narrow aligned rectangular aperture 48 in a plate member 50. Mounted on the downstream face of the plate member 50 is a reciprocable knife member 51 suitably disposed so as to traverse the rectangular aperture 48 and thereby sever the advanced portion of the strip of terminal tab material from the remainder thereof.

Operating in conjunction with the terminal tab feed assembly 38 is a terminal tab displacing mechanism adapted to releasably grasp the advanced length of terminal tab material, introduce the lead edge of the same after severance from the remainder of the strip, in the desired positional relationship, into the bite area 26 of the capacitor section being wound and to permit release of the terminal tab member after engagement of the lead edge thereof by the convergence of the foil and conducting strips in the bite area. In the illustrated embodiment, there is provided a pair of horizontally disposed arm members 52 and 54, hinged together at the trailing edge thereof, as at 56, and mounted, as at 58, on a substantially vertically disposed rotatable shaft 60. The arms 52 and 54 are provided with a pair of flat facing surfaces 52a and 54a which are normally biased into compressive terminal tab grasping relationship by a biasing spring member 62 mounted thereon.

The biasing spring member 62 should be of sufficient strength to assure the grasping of the terminal tabs intermediate the facing surfaces 52a and 54a and to prevent displacement of the tab member relative thereto and yet permit removal of the tab member when the lead edge thereof is engaged by the foil and dielectric strips at the point of convergence thereof in the bite area 26.

To facilitate introduction of the lead edge of a grasped terminal tab into the bite area 26 the terminal tab grasping end 64 of the arm members 52 and 54 are made of reduced width and are provided with a sharply tapering configuration as illustrated at 65 in FIG. 6.

The adjacent portion of the arm members 52 and 54 may, as illustrated in FIG. 7, be of substantially rectangular configuration to provide a convenient operating surface against which the biasing spring member 62 may operate. The desired configuration of the portion of the arms 52 and 54 disposed on the other side of the mounting 58 thereof is illustrated in FIG. 8. As there shown, one edge portion may be provided with an inwardly directed notch 66 formed by suitably beveling the bordering edges of the faces 52a and 54a. The notch 66 is disposed so as to be cooperatively engaged by a reciprocable wedge shaped cam member 68, in order to effect a separation of the faces 52a and 54a to permit introduction of a terminal tab member therebetween.

The arm members 52 and 54 are adapted to be rotatably displaced from a terminal tab receiving location, wherein the arm members are disposed in alignment with the strip of terminal tab material, as indicated by the dotted lines, to a terminal tab delivery location, wherein the leading edge 70 of the terminal tab is disposed parallel to the axis of the mandrel 12. With careful control of the positioning of the unit, the above described rotational displacement will provide that the lead edge 70 of the terminal tab will be disposed sufficiently within the bite area 26 to permit engagement thereof by the converging foil and dielectric strips sufficient to effect the removal of said terminal tab from the arm members 52 and 54.

If desired, however, the unit may be positioned so that the rotative displacement of the arms 52 and 54 results in the disposition of the leading edge 70 in the desired parallel relationship with the mandrel 12 but just short of the point where the desired gripping thereof by the converging foil and dielectric strips will be effected. A slight longitudinal displacement of the entire unit towards the mandrel 12 will then effect the desired introduction of the leading edge 70 sufficiently into the bite area 26 to assure the removal of the tab from the arms 52 and 54 by the converging foil and dielectric strips. As will be apparent to those skilled in this art, the illustrated displacement of the web severing knife 51 and the wedge shaped cam member 68 is a simple reciprocal movement in a single plane. Such type of displacement motion can be readily effected, as for example, by utilization of a reciprocating solenoid actuated armature, such as that disclosed in Heyman Patent 2,710,441. Suitable feed roll drive mechanism is also disclosed therein.

The essentials of a suitable drive for effecting the desired displacement of the arm members 52 and 54 is illustrated in FIGS. 9 and 10. As there illustrated the vertically disposed rotatable shaft 60 is mounted on a suitable plate 72 and the upper end thereof is provided with an oval shaft 74 to effect rotation of the arms 52 and 54 and to permit separation of the facing surfaces 52a and 54a thereof by the wedge shaped cam member 68 as described above. The lower portion of the shaft 60 has a bevel gear 76 mounted thereon arranged to be driven through a drive gear 78 which in turn is driven through a flexible coupling 80. In order to provide positive control of the displacement limits adjustable set screws 82 and 84 are provided adjacent the terminal tab receiving and delivery positions.

The mounting of the above described elements forming the terminal tab feed assembly 38 and the terminal tab displacing mechanism on the plate 72 and the rendering of the positioning of the plate adjustable relative to the winding mandrel 12 permits desired alignment thereof to effect the proper positional disposition of the lead edge 70 of the tab relative to the bite area irrespective of the size of terminal tab employed or the size of the capacitor section 14 being wound thereon.

In operation of the illustrated unit the arm members 52 and 54 will be disposed in the terminal tab receiving position, as indicated by the dotted lines on the drawing, and the winding of the capacitor section 14 will be commenced. At the desired point in the winding operation the tab insertion unit will be actuated and the following two operations will take place. The wedge shaped cam member 68 will be displaced into engagement with the notch 66 camming open the facing surfaces 52a and 54a of the arm members 52 and 54 respectively. Immediately subsequent thereto the feed rolls 42 and 44 will advance a predetermined length of terminal tab material through the aperture 48 in the plate 50 and into position intermediate the now open surfaces 52a and 54a at the grasping end 64 of the arm members 52 and 54. The length of the advance of the terminal tab material will be determined by the dimensions of the particular terminal tab element that is to be employed in the particular capacitor section being wound and as described above the positioning of the entire unit relative to the mandrel 12 will be preset before the start of the operation. After advance of the strip of terminal tab material, the wedge shaped cam member 68 will be retracted and the facing surfaces 52a and 54a will close, under action of the biasing spring member 62, upon the trailing edge portion 86 of the advanced segment of the terminal tab material.

Subsequent to the grasping of the terminal tab material by the grasping end 64 of the arm members 52 and 54 the knife member 51 will be actuated to traverse the slot 48 and thereby sever the advanced and grasped length of terminal tab material from the remainder of the strip thereof.

After the severing of the terminal tab material the vertically disposed shaft 60 is rotated to displace the arm members 52 and 54 into the terminal tab delivery position. As explained earlier the positioning of the unit may be such that at this location the leading edge 70 of the terminal tab is introduced, in substantially parallel relationship with the axis of the mandrel 12, into the bite 26 of the capacitor section being wound a sufficient distance to permit the grasping thereof by the converging adjacent surfaces of a foil and dielectric strip being wound and removal or stripping of the tab element from the grasping engagement of the arms 52 and 54. Alternatively however the positioning of the unit may be such that at this location the leading edge 70 will be spaced from the bite area and an additional longitudinal displacement of the entire unit will be required to effect the desired engagement of the tab element by the surfaces of the converging foil and dielectric strips.

The above sequence of operations assures the desired positional disposition of the terminal element in the wound unit, since the tab element is mechanically grasped at all points in the operation up to the stripping of the element from the arm members 52 and 54 by the action of the converging foil and dielectric strips in the bite area 26.

It will be apparent to those skilled in the art of capacitor fabrication that the actual configuration of the grasping end of the arm members 52 and 54 as well as the particular location at which the terminal element is grasped thereby may vary in accordance with the dimensions of the particular tab element employed and the dimensions of the particular condenser being wound. For example, extremely narrow tab elements may necessarily have to be held at the end thereof and the arm members positioned so that only the ungrasped portion of the terminal be introduced into the bite area of the capacitor being wound.

In the embodiment of the invention illustrated in FIGURES 4–10, the terminal tab element is introduced into the bite area 26 by a rotational displacement of the arm members 52 and 54. FIG. 11 by way of further example schematically illustrates a mechanism incorporating the principles of the invention and employing a purely lineal type of movement by which the leading edge of the terminal tab element is introduced into the bite area of the section being wound. As there illustrated there is provided a vertically disposed plate member 100, which may be the frame member of the capacitor winding machine itself, and having a winding mandrel 12 extending therefrom. Mounted on the rear of the plate 100 is the terminal tab feed assembly 38 which, as described earlier, contains suitable mechanism, such as a pair of feed rolls, to advance a predetermined length of terminal tab material from a strip supply thereof. In this embodiment the lead end of the strip of terminal tab material is advanced perpendicular to and through the plate 100 and through a suitable feed plate 102 projecting from the front face thereof. A reciprocable knife member 104 is provided to sever the advanced length of terminal tab material from the remainder of the strip thereof. In this embodiment the terminal tab grasping and displacing mechanism is disposed perpendicular to the plate 100 and includes a pair of arm members 52 and 54 of the type described earlier, having the terminal tab grasping end 64 thereof disposed so as to receive the trailing edge of the advanced length of terminal tab material. A reciprocable wedge shaped cam member 68 is again provided to effect the desired opening of the arm members 52 and 54 against the action of the biasing spring member 62.

The above described positional disposition of the component elements provides that the leading edge 106 of an advanced, grasped and severed terminal tab 108 is disposed parallel with the axis of the mandrel 12 prior to any required displacement of the arm members 52 and 54. In order to advance said leading edge 106 into the bite of the wound unit a slide member 110 is provided to permit, guide and limit the necessary horizontal reciprocation of the arm members 52 and 54, which is the only type of displacement that is required in this instance.

The general sequence of operations for this embodiment is the same as that described above in conjunction with the earlier described embodiments and, which, also assures the continuous grasping of the tab member up to its removal from the arm members 52 and 54 by the stripping action of the converging foil and dielectric layers.

Having thus described my invention, I claim:

1. Apparatus for inserting rectangularly shaped terminal tab members in a convolutely wound capacitor section as the same is being framed by winding a plurality of converging conducting and dielectric strips upon a mandrel and wherein said converging strips form a bite area adjacent the point of convergence thereof comprising a pair of pivotally connected clamping surfaces for releasably and selectively grasping an edge portion of a rectangularly shaped tab element, means for displacing said clamping surfaces and a tab element releasably grasped thereby toward said mandrel to introduce the edge of said terminal tab element disposed substantially parallel to and remote from the grasped edge thereof into the bite area of said section in substantial parallelism with the longitudinal axis of said convolutely wound section and means for limiting displacement of said clamping surfaces at a predetermined location wherein engagement of said introduced edge of said terminal tab by said converging conducting and dielectric strips being convolutely wound effects removal thereof from said clamping surfaces.

2. Apparatus as specified in claim 1 including means for delivering a length of terminal tab material to said clamping surfaces when said clamping surfaces are disposed remote from said mandrel and means for severing said delivered length of tab material after the same is grasped by said clamping surfaces.

3. Apparatus as specified in claim 1 including means for placing said clamping surfaces in compressive engagement and associated means for opening said clamping surfaces against the action of said last mentioned means to permit introduction of an edge portion of a terminal tab element therebetween.

References Cited in the file of this patent
UNITED STATES PATENTS

| | | |
|---|---|---|
| 2,040,323 | McCain | May 12, 1936 |
| 2,710,441 | Heyman | June 14, 1955 |

UNITED STATES PATENT OFFICE
CERTIFICATE OF CORRECTION

Patent No. 3,018,064                                January 23, 1962

William Dubilier

It is hereby certified that error appears in the above numbered patent requiring correction and that the said Letters Patent should read as corrected below.

Column 7, line 33, for "framed" read -- formed --.

Signed and sealed this 24th day of July 1962.

(SEAL)
Attest:

ERNEST W. SWIDER                                    DAVID L. LADD
Attesting Officer                                        Commissioner of Patents